(12) United States Patent
Parashari et al.

(10) Patent No.: US 11,740,961 B1
(45) Date of Patent: Aug. 29, 2023

(54) DATA RECOVERY USING DYNAMIC SEGMENT ORDERING

(71) Applicant: Micron Technology, Inc., Boise, ID (US)

(72) Inventors: Prashant Parashari, Hyderabad (IN); Gaurav Singh, Kolkata (IN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/701,976

(22) Filed: Mar. 23, 2022

(51) Int. Cl.
*G06F 11/10* (2006.01)
*G06F 3/06* (2006.01)

(52) U.S. Cl.
CPC ........ *G06F 11/1044* (2013.01); *G06F 3/0619* (2013.01); *G06F 3/0653* (2013.01); *G06F 3/0688* (2013.01); *G06F 11/1076* (2013.01)

(58) Field of Classification Search
CPC .. G06F 11/1044; G06F 3/0619; G06F 3/0653; G06F 3/0688; G06F 11/1076
See application file for complete search history.

(56) References Cited

U.S. PATENT DOCUMENTS 9,947,401 B1 * 4/2018 Navon ................ G06F 11/3034
2022/0231785 A1 * 7/2022 Beery ................... H04L 1/0052

\* cited by examiner

*Primary Examiner* — Kyle Vallecillo
(74) *Attorney, Agent, or Firm* — Nicholson De Vos Webster & Elliott LLP

(57) ABSTRACT

Methods, systems, and apparatuses include generating recovery likelihood metrics for undecodable segments in a stripe of data distributed across a redundant array of storage nodes. The recovery likelihood metrics are based on a determination of a likelihood of recovering the undecodable segment. The undecodable segments are ranked based on the recovery likelihood metrics. The undecodable segments are recovered in an order based on the ranking starting with the undecodable segment with the highest likelihood of recovery.

20 Claims, 13 Drawing Sheets

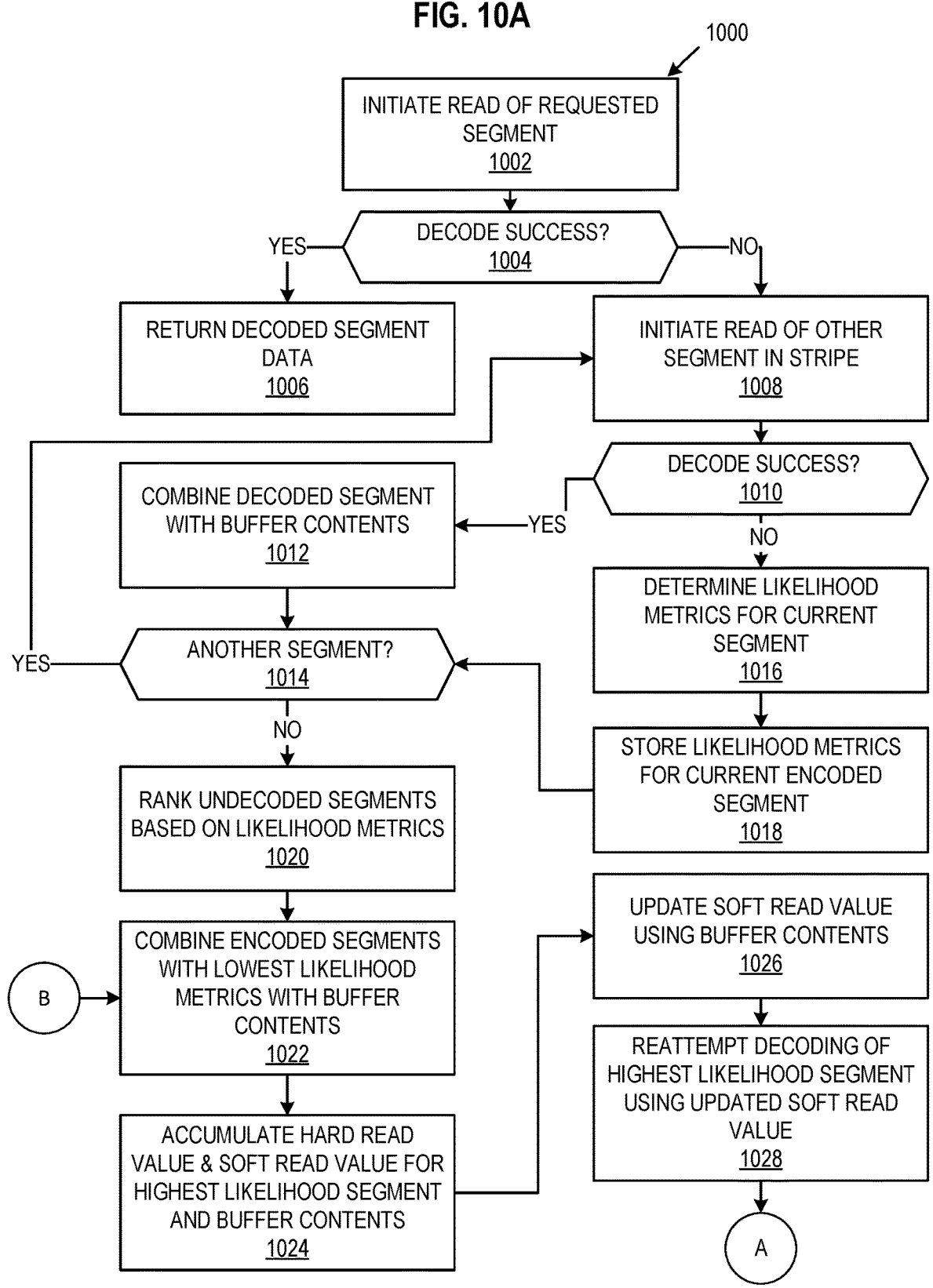

DATA RECOVERY USING DYNAMIC SEGMENT ORDERING

TECHNICAL FIELD

The present disclosure generally relates to data recovery, and more specifically, relates to data recovery using dynamic segment ordering.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 10A is a flow diagram of an example method for data recovery using dynamic segment ordering in accordance with some embodiments of the present disclosure.

DETAILED DESCRIPTION

Figure 1:
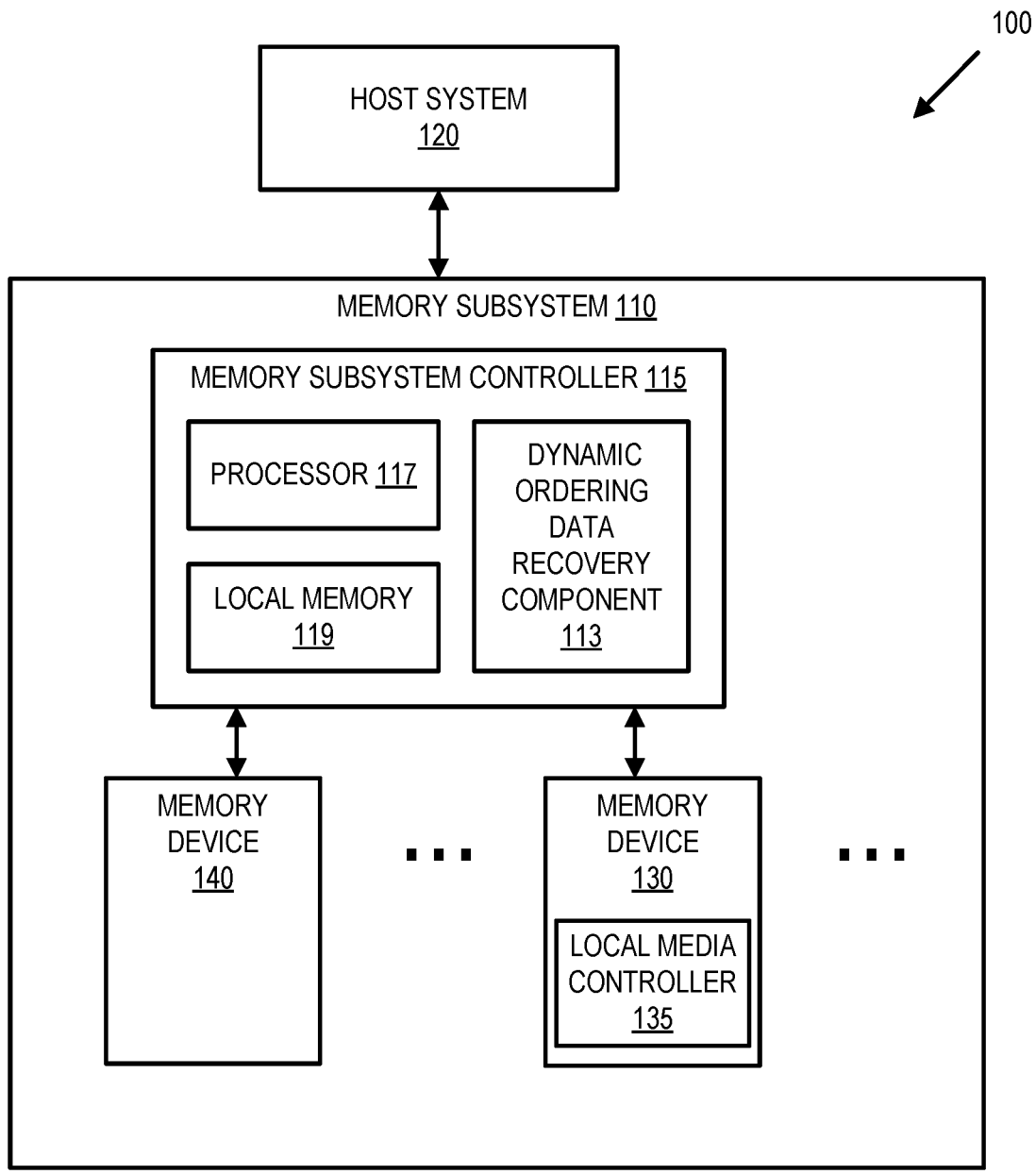
FIG. 1 illustrates an example computing system that includes a memory subsystem in accordance with some embodiments of the present disclosure.

Aspects of the present disclosure are directed to data recovery using dynamic segment ordering in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Memory devices (e.g., non-volatile memory) can suffer from errors in the writing or retention of bits that are stored within the memory devices. An error correcting code (ECC) is a mechanism to correct these errors in the memory. ECC uses redundant data, referred to as parity data, to enable the ECC process to recover and correct errors in the normal data. Parity bits are utilized in conjunction with normal data bits, which are both stored in the memory device, and are utilized by the ECC process to detect and correct any bit errors in the stored data when the parity bits are not consistent with their associated data. Highly effective ECC processes can utilize low-density parity codes (LDPC), Bose, Chaudhri, and Hocquenghem (BCH) codes, Reed-Solomon codes, and similar code systems as part of the ECC process. These codes are derived from the data stored in the memory devices and can be used to correct the memory data where errors occur. Such processes can use statistical models, such as log likelihood ratio (LLR), to represent the data to correct errors.

Memory subsystem can utilize multiple ECC processes to correct errors. For example, if an LDPC decoder fails to recover a translation unit (TU) or other segment of data, a memory device can attempt recovery using parity data derived from that segment of data and other segments of data that, together, make up a stripe in a redundant array of independent nodes (RAIN). As used herein, nodes refer to storage devices (i.e., storage nodes), storage servers, etc. In one embodiment, RAIN refers to a redundant array of independent NAND. A parity TU can be formed by generating the result of applying an exclusive-or (XOR) to all of the user data TU's in the stripe. Traditional data recovery using RAIN parity data (in which there is only one RAIN parity segment), however, is limited to a single failed TU. Including additional segments of parity data can increase data recovery capabilities but results in an undesirable increase in storage overhead.

By using a combination of error correction schemes, e.g., using RAIN parity data to modify the statistical modeling of an ECC process, such as LDPC, recovery of multiple TU's is possible. Although this combination of error correction schemes allows for the recovery of multiple TU's, the process attempts to recover one TU at a time. The successful recovery of one TU increases the likelihood of the recovery of another TU. Attempting to recover TUs in a random or suboptimal order, therefore, leads to a lack of efficiency in recovery time as well as a decreased chance of recovery.

Aspects of the present disclosure address the above and other deficiencies by using recovery likelihood metrics to rank multiple TUs in a stripe that have suffered decoding failures. Specifically, the TUs that have failed decoding may be ranked from high to low based on recovery likelihood metrics. The TU with the highest likelihood of recovery may then be subjected to a recovery attempt first. In the event of a successful recovery, the TU with the next highest likelihood for recovery may next be subjected to a recovery attempt. In the event of a failed recovery, the process may be abandoned. These recovery likelihood metrics can include one or more of raw bit error rate (RBER) values, changes in voltage threshold distribution and values (Vt), etc. For example, high RBER counts may make a TU less likely to decode. Large changes in the threshold voltage (Vt) distribution or Vt shift may likewise indicate a low likelihood of decoding a particular TU. As a result of ordering the recovery of TU's based recovery likelihood, the chance of a recovery for each successive TU increases due to strengthened parity data values and recovery time is optimized by reducing time spent on recovery attempts for TUs that are more likely to fail recovery. Additionally, if recovery fails on the TU that is more likely to be recovered than other TU's, the recovery scheme can efficiently avoid attempting to recovery TU's with a lower likelihood of recovery.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a dynamic ordering data recovery component 113 that can implement data recovery using dynamic segment ordering. In some embodiments, the controller 115 includes at least a portion of the dynamic ordering data recovery component 113. For example, the controller 115 can include a processor 117 (processing device) configured to execute instructions stored in local memory 119 for performing the operations described herein. In some embodiments, a dynamic ordering data recovery component 113 is part of the host system 120, an application, or an operating system.

The dynamic ordering data recovery component 113 can generate recovery likelihood metrics for one or more undecodable segments in a stripe of data. The dynamic ordering data recovery component 113 can also rank the one or more undecodable segments based on the recovery likelihood metrics. The dynamic ordering data recovery component 113 can also attempt to recover the undecodable segments in an order according to their ranking. Further details with regards to the operations of the dynamic ordering data recovery component 113 are described below.

Figure 2:
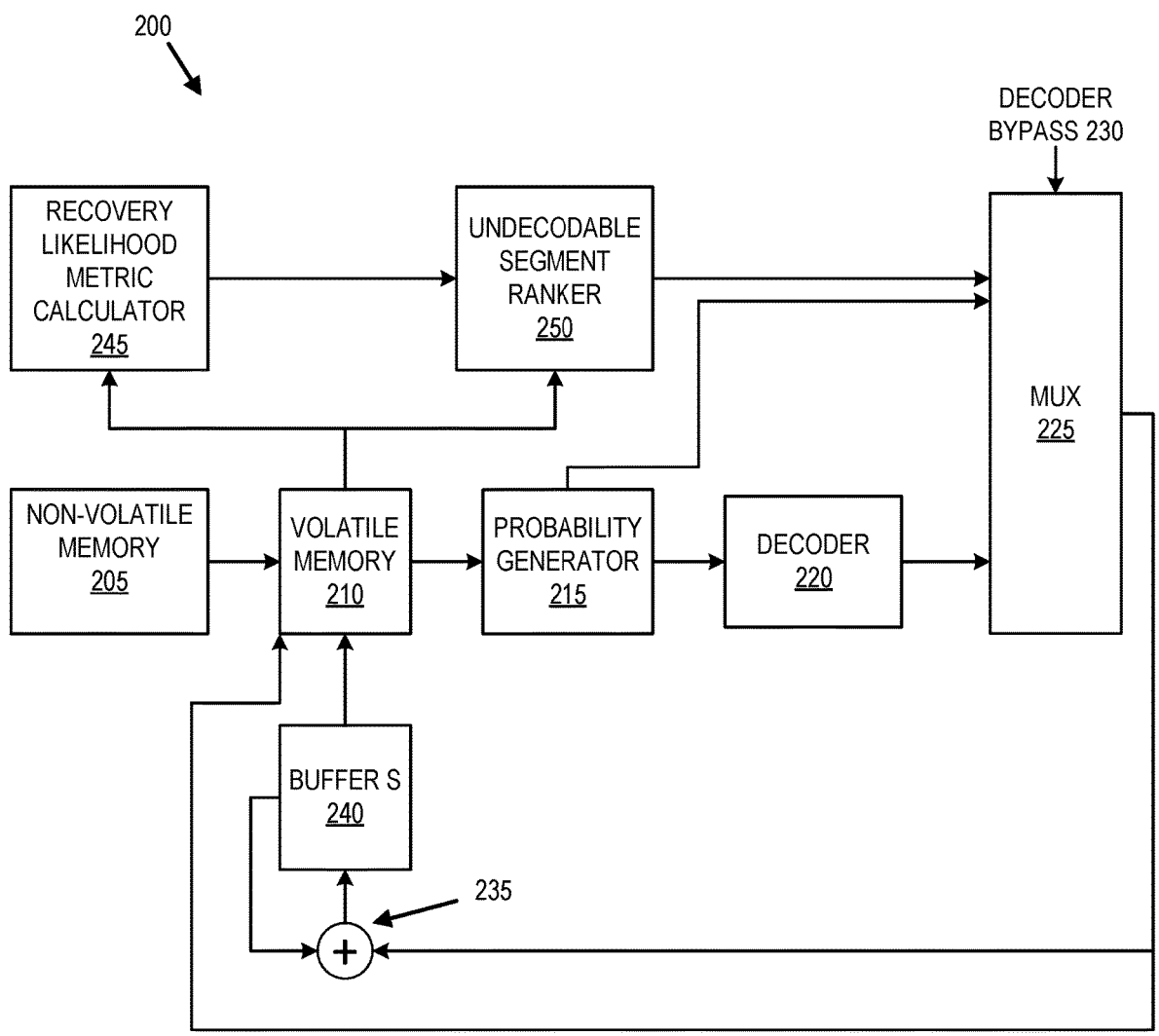
FIG. 2 is a block diagram of logic and memory subsystem components to implement data recovery using dynamic segment ordering in accordance with some embodiments of the present disclosure.

FIG. 2 is a block diagram of logic and memory subsystem components to implement data recovery using dynamic segment ordering in accordance with some embodiments of the present disclosure. One or more of the logic and memory subsystem components 200 can be implemented as a part of dynamic ordering data recovery component 113 and/or memory subsystem controller 115. The logic and memory subsystem components 200 include non-volatile memory 205 and volatile memory 210, which can be implemented by memory devices 130 and 140, respectively.

Non-volatile memory 205 may store user data and parity data. For example, non-volatile memory 205 can be configured to store encoded data in RAIN stripes. In another embodiment, non-volatile memory 205 stores encoded data in RAID (redundant array of independent disks) stripes. In still other embodiments, non-volatile memory 205 may store encoded data in stripes according to other implementations.

Volatile memory 210 temporarily stores user data, parity data, statistical models and other data when raw encoded data is read from non-volatile memory, decoded, or otherwise used during data recovery using dynamic segment ordering according to embodiments of the present disclosure. In one embodiment, decoded data is provided to host system 120 by temporarily storing the decoded data in volatile memory 210 and responding to a read request form host system 120 with the location in volatile memory 210 storing the decoded data. In some embodiments, decoded data may be temporarily stored in volatile memory 210 while recovering other segments in the same stripe. This decoded data may be provided to host system 120 or may be used during data recovery using dynamic segment ordering according to embodiments of the present disclosure.

Probability generator 215 generates statistical models including values to indicate the likelihood that the data is correct. Memory devices can suffer from errors in the writing or retention of bits that are stored within the memory devices due to drift, read disturb, or other parasitic effects. In one embodiment, probability generator 215 generates likelihood values based on a comparison of a read voltage level and a threshold voltage level. For example, multiple sensing levels can be used to detect the binary values of bits within a segment. In one embodiment, reading a segment includes reading data at a "hard read" sensing level and one or more "soft read" sensing levels to generate the likelihood values. In one embodiment, the probability generator 215 generates an LLR value based upon these sensing levels.

Decoder 220 decodes the raw encoded data read from non-volatile memory 205. In one embodiment, decoder 220 uses an iterative process of adjusting the values of the raw encoded bits in order to satisfy one or more parity checks. For example, decoder 220 can use the LLR or other statistical model provided by probability generator 215 to iteratively adjust the values of the encoded bits in an attempt to satisfy the parity check(s). In one embodiment, decoder 220, when successful in decoding data, generates decoded data along with a statistical model for that data. The statistical model generated by 220 can be another LLR, syndrome weights, or another indication of the likelihood that the bit values are correct. In one embodiment, when decoder 220 fails to satisfy the parity check(s), decoder 220 generates an indication of decoding failure as well as an output vector, syndrome weights, or other data or metadata related to the attempt at decoding the segment. In one embodiment, decoder 220 is an LDPC decoder.

MUX 225 is a multiplexer or similar device that allows for the selection between different inputs for output. For example, an inactive value on decoder bypass 230 can select the output of decoder 220, i.e., the decoded segment of data, and an active value on decoder bypass 230 can select the raw encoded data (i.e., undecoded data/encoded data with the possibility of flipped or noisy bits). In one embodiment, the raw encoded data is provided as an input to MUX 225 by volatile memory 210. In another embodiment, the raw encoded data is provided along with a statistical model provided by probability generator 215 (while still bypassing decoder 220). In still another embodiment, the raw encoded data is provided as an input to MUX 225 by undecodable segment ranker 250 which may receive the raw encoded data from volatile memory 210. In still another embodiment, the raw encoded data is provided as an input to MUX 225 along with a statistical model provided by probability generator 215 (while bypassing decoder 220).

In one embodiment, decoder bypass 230 is set to an active state (selecting the raw encoded data as an output) in response to a decoding failure. In other words, decoder bypass 230 can be set to an active state or inactive state at various stages of the data recovery process. For example, dynamic ordering data recovery component 113 can set decoder bypass 230 to an active state in response to comparing the initial syndrome weight of a segment and the syndrome weight of the segment at termination of decoding or otherwise when decoder 220 determines that decoding has failed. From the initial syndrome weight, dynamic ordering data recovery component 113 estimates how many erroneous bits there are in the segment. Based on the final syndrome weight and the number of bits flipped by the decoder, dynamic ordering data recovery component 113 can also estimate how many erroneous bits there are in the output vector from the decoder (even when decoder 220 fails to decode a segment, there is still an output vector). One or more of the syndrome weights or flipped bits can be used to trigger the setting of decoder bypass 230 to an active state. In one embodiment, dynamic ordering data recovery component 113 sets decoder bypass 230 to an active state in response to the ratio of the initial syndrome weight and the number of bit flips satisfying a threshold value. For example, if the ratio is less than or equal to the threshold, dynamic ordering data recovery component 113 sets decoder bypass 230 to an active state. In some embodiments, undecodable segment ranker 250 may set decode bypass 230 to an active state. For example, undecodable segment ranker 250 may store data relating to undecodable segments and set decode bypass 230 to an active state when the segment being provided as an input to MUX 225 is a known undecodable segment. In some embodiments, a segment is considered a known undecodable segment when decoder 220 has previously determined that the segment cannot be decoded as described in the various embodiments above.

The output of MUX 225 is subjected to combination logic 235 and the result is stored in Buffer S 240. In one embodiment, the memory subsystem 110 compresses or removes statistical model data from a result of a segment read before passing the segment to combination logic 235 or as a part of combination logic 235. For example, compressing statistical data can include rounding a value to enable the use of fewer bits to represent that value. Combination logic 235 can be implemented in firmware, hardware, or a combination thereof. When decoder 220 decodes a segment, the output of MUX 225, the decoded segment, may be sent, either directly or indirectly through buffer 240 to volatile memory 210 for storage and future use. In some embodiments, when decoder bypass 230 is enabled and the output of MUX 225 includes an undecodable segment from undecodable segment ranker 250 and an associated statistical model from probability generator 215, this output is sent, either directly or indirectly through buffer 240 to volatile memory 210 for storage and future use.

In one embodiment, combination logic 235 provides a simple XOR operation between the current contents of Buffer S 240 and the output of MUX 225. For example, combination logic 235 can XOR hard read values of segments of data. In one embodiment, the combination is the min operation, i.e., selecting the smallest absolute value among the statistical model data. In another embodiment, the combination includes applying different scaling factors to the statistical model data of segments that failed the decoding process based on syndrome weights and selecting a combined value from a lookup table (LUT) based on the scaled statistical model data. In one embodiment, the entries/ values of the lookup table are pre-determined by an optimization process using techniques, such as a hill climbing algorithm. In another embodiment, combination logic 235 uses a lookup table and/or a function to combine the output of MUX 225 with the contents of Buffer S 240. For example, combination logic 235 can use statistical model data, such as number of failed segments in the RAIN stripe, initial syndrome weight(s), syndrome weight(s) at termination of decoding, a number of bit-flips during decoding, or other decoding status data, and hard read data values to select a combined value or scaling factor from a lookup table. As another example, combination logic 235 can combine segments by generating a product of the lookup table output (LUT_output), such as a scaling factor, and statistical model data from each read:

$$LLR(c_1)=LUT\_output \times \pi_{i=2,3,\ldots,n} sign(LLR(ci))$$

In some embodiments, combination logic 235 uses results generated by recovery likelihood metric calculator 245 and undecodable segment ranker 250 to combine the output of MUX 225 with the contents of Buffer S 240. For example, combination logic 235 can combine segments determined by the results of recovery likelihood metric calculator 245 and undecodable segment ranker 250 to be segments with the lowest likelihood of recovery.

The result generated by combination logic 235, as applied in a successive manner to each segment, is stored in Buffer S 240. When all other segments of the stripe have been combined, the resulting combined value stored in Buffer S 240 is used to modify the statistical model of the segment that failed in decoding and is currently being recovered. For example, similar to the combination process described above, the result generated by combination logic 235 can be used to access a value in a lookup table to select a scaling factor to apply to the LLR or other statistical model for the segment that failed in decoding and is being recovered. The updated statistical model can then be used in the soft decoding process for the requested segment.

The output of volatile memory 210, in some embodiments, is provided as an input to recovery likelihood metric calculator 245 and undecodable segment ranker 250. For example, if decoder 220 indicates a decoding failure, volatile memory 210 can provide the segment that failed decoding to recovery likelihood metric calculator 245 and undecodable segment ranker 250. This may then be repeated for each segment that fails decoding, referred to as undecodable segments.

Recovery likelihood metric calculator 245 calculates one or more recovery likelihood metrics for each undecodable segment. For example, in some embodiments, recovery likelihood metric calculator 245 calculates a residual or raw bit error rate (RBER) associated with each undecodable segment. In some embodiments, the recovery likelihood metric calculator 245 compares the RBER calculated for each undecodable segment with a threshold RBER value to calculate one or more recovery likelihood metrics for each undecodable segment.

In some embodiments, recovery likelihood metric calculator 245 calculates an auto read calibration (ARC) RBER, threshold voltage (Vt) distribution shape, and/or Vt shift. For example, recovery likelihood metric calculator 245 may perform a Vt sweep to determine Vt distribution shape, Vt shift, or various other aspects relating to the threshold voltage. Recovery likelihood metric calculator 245 may therefore obtain Vt sweep data from this Vt sweep and compare the obtained Vt sweep data with ideal Vt sweep data to determine Vt shift, changes in Vt distribution shape, or other characteristics relating to the Vt sweep.

In some embodiments, recovery likelihood metric calculator 245 determines an overall recovery likelihood metric based on one or more of these variables and provides the recovery likelihood metric to undecodable segment ranker 250 identifying the undecodable segment associated with the recovery likelihood metric. In other embodiments, recovery likelihood metric calculator 245 calculates one or more of the variables and provides the one or more variables to undecodable segment ranker 250 identifying the undecodable segment associated with the one or more recovery likelihood metrics. For example, recovery likelihood metric calculator 245 may calculate a RBER for an associated undecodable segment and obtain a differential RBER by comparing the calculated RBER to a threshold RBER. Recovery likelihood metric calculator 245 may then provide the differential RBER to undecodable segment ranker 250 as opposed to the calculated RBER.

Undecodable segment ranker 250 ranks the undecodable segment(s) according to the provided recovery likelihood metrics. For example, undecodable segment ranker 250 may receive the recovery likelihood metrics for three undecodable segments and determine, based on the associated recovery likelihood metrics, the undecodable segment with the highest likelihood or recovery. In some embodiments, the undecodable segment with the highest likelihood of recovery is the undecodable segment with the lowest RBER. In other embodiments, the undecodable segment with the highest likelihood of recovery is the undecodable segment with the lowest threshold voltage shift. In still other embodiments, the undecodable segment with the highest likelihood of recovery is the undecodable segment with the smallest change in threshold voltage distribution. In still other embodiments, the undecodable segment with the highest likelihood of recovery is determined through a combination of these and/or other variables.

Undecodable segment ranker 250 may then provide as an input to MUX 225 the undecodable segments with the lower likelihoods of recovery (e.g., all segments except the segment with the highest likelihood of recovery). The segment with the highest likelihood of recovery will not be provided as an input to MUX 225 by undecodable segment ranker 250 and will instead be decoded by decoder 220. For example, to decode the undecodable segment with the highest likelihood of recovery, combination logic 235 may operate on the other segments in the stripe of data, including all the undecodable segments with lower likelihoods of recovery. In some embodiments, as explained above, undecodable segment ranker 250 may provide the raw encoded data of undecodable segments with the lowest likelihoods of recovery along with a statistical model provided by probability generator 215 (while still bypassing decoder 220).

Data recovery using logic and memory subsystem components 200 is described further with reference to FIGS. 3-9.

Figure 3:
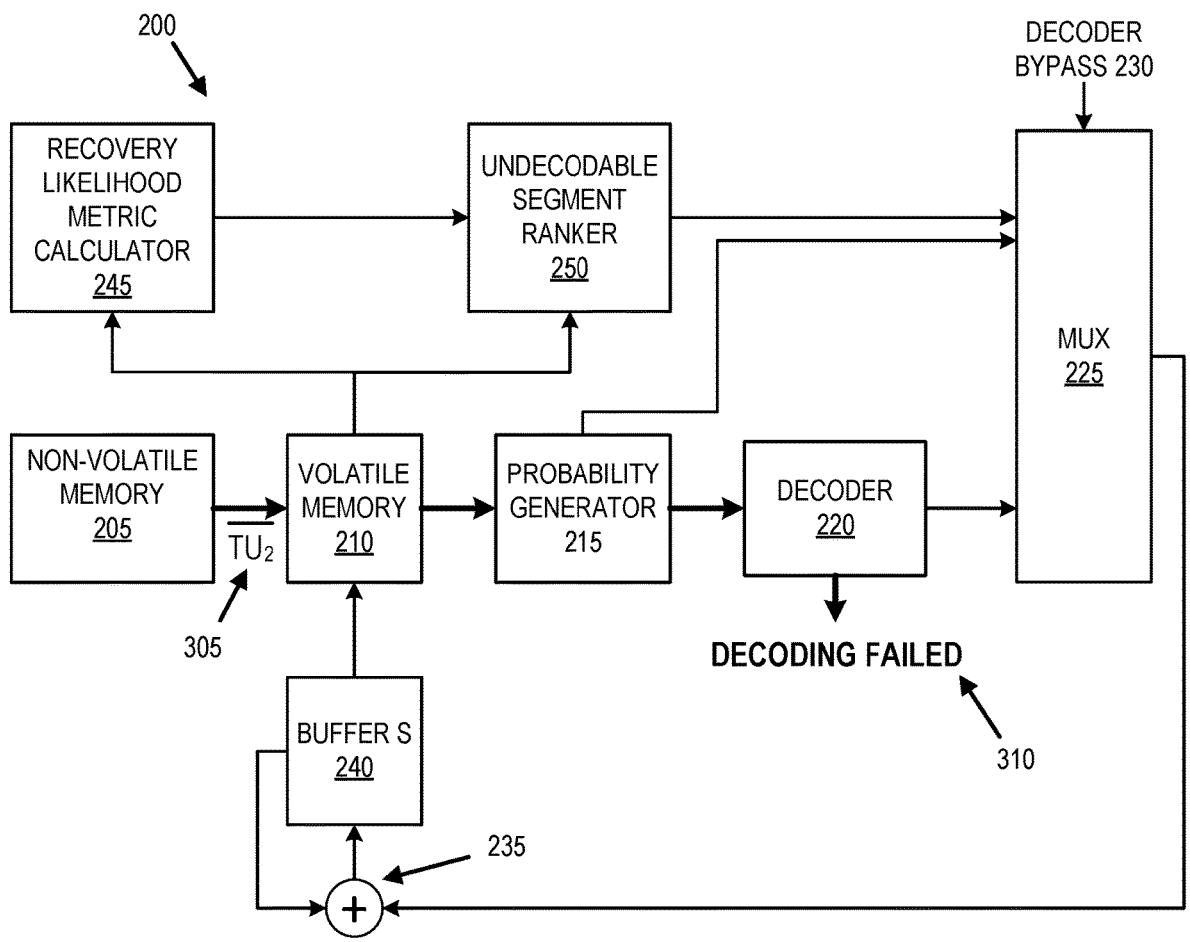
FIG. 3 is an example of the use of logic and memory subsystem components to implement data recovery using dynamic segment ordering in accordance with some embodiments of the present disclosure.

FIGS. 3-9 illustrate an example of the use of logic and memory subsystem components 200 to implement data recovery using dynamic segment ordering in accordance with some embodiments of the present disclosure. In FIG. 3, memory subsystem 110 reads an encoded segment $\overline{TU_2}$ 305 from non-volatile memory 205 into volatile memory 210. For example, memory subsystem 110 can execute a read in response to a request from host system 120 for segment $TU_2$. As used herein, the inclusion of a bar over a segment represents undecoded data and the lack of a bar over the segment represents decoded data.

Probability generator 215 generates a statistical model (e.g., LLR) based on the read and provides the encoded segment $\overline{TU_2}$ 305 and statistical model to decoder 220.

Decoder 220 attempts to decode the segment $\overline{TU_2}$ 305 but fails 310. In response to the decoding failure, dynamic ordering data recovery component 113 initiates data recovery using dynamic segment ordering.

Figure 4:
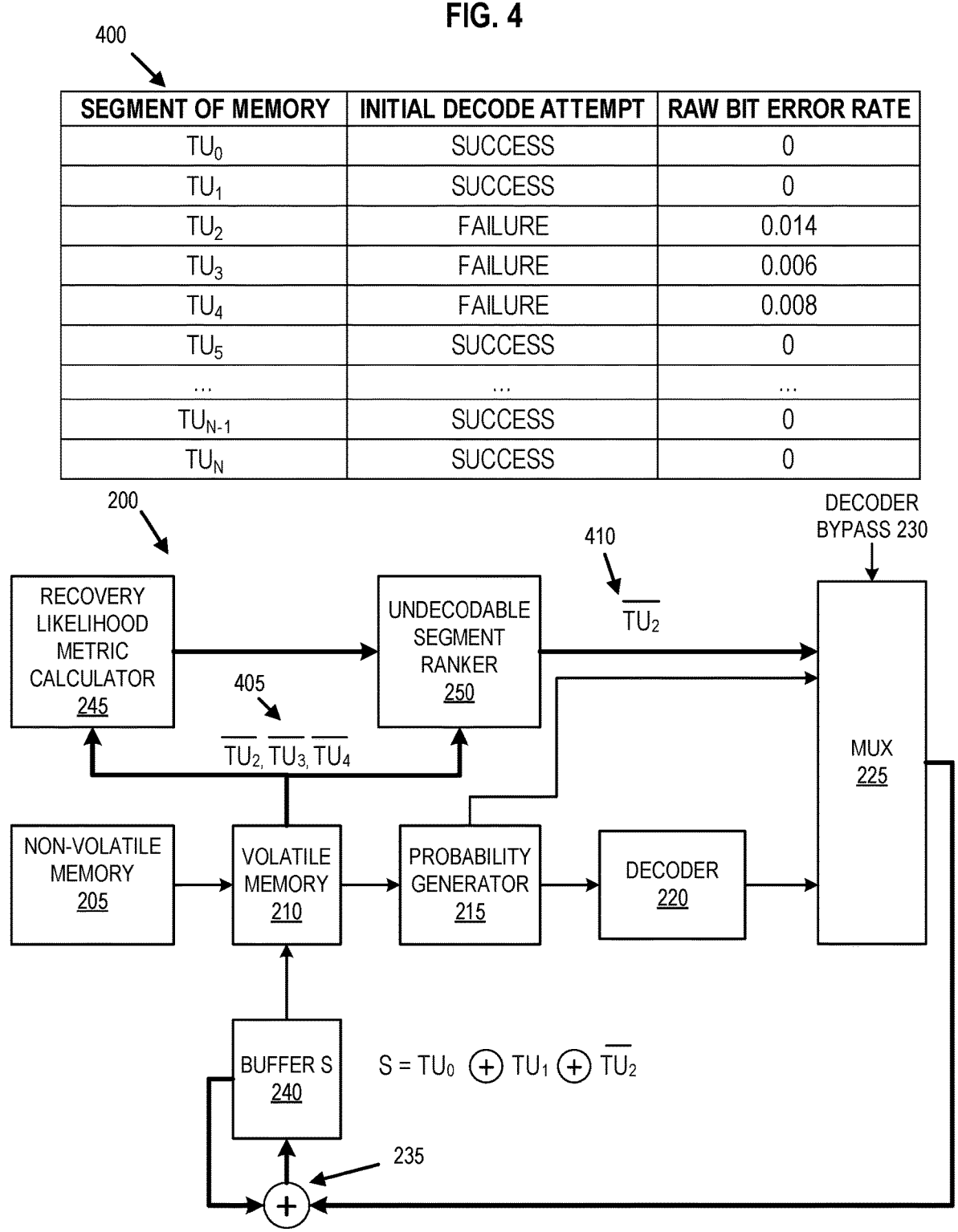
FIG. 4 is a continuation of the example of the use of logic and memory subsystem components to implement data recovery using dynamic segment ordering in accordance with some embodiments of the present disclosure.

In FIG. 4, in response to the decoding failure of encoded segment $\overline{TU_2}$ 305, dynamic ordering data recovery component 113 initiates data recovery using dynamic segment ordering. Dynamic ordering data recovery component 113 triggers a read of other segments of the same stripe as encoded segment $\overline{TU_2}$ 305. Table 400 illustrates that an initial decode attempt on each segment can either end in success or failure. The determined success or failure of the decoding of each segment will trigger how each segment is used to recover the requested data (as described further below). As illustrated, table 400 represents a stripe that contains multiple segments that failed the decoding process and, therefore, are not recoverable using, e.g., traditional RAIN stripe parity data alone.

Memory subsystem 110 reads an encoded segment $\overline{TU_0}$ from non-volatile memory 205 into volatile memory 210. Probability generator 215 generates a statistical model (e.g., LLR) based on the read and provides the encoded segment $\overline{TU_0}$ and statistical model to decoder 220. Decoder 220 successfully decodes the segment $\overline{TU_0}$, resulting in decoded segment $TU_0$. Given the success of decoder 220, decoder bypass 230 remains inactive and decoded segment $TU_0$ (hard read data only or hard and soft read data combined) is passed by MUX 225 to combination logic 235. Buffer S 240 is currently empty, so the resulting combination results in Buffer S 240 storing decoded segment $TU_0$ (or decoded segment $TU_0$ combined with an initial/default value).

Memory subsystem 110 reads an encoded segment $\overline{TU_1}$ from non-volatile memory 205 into volatile memory 210. Probability generator 215 generates a statistical model (e.g., LLR) based on the read and provides the encoded segment $\overline{TU_1}$ and statistical model to decoder 220. Decoder 220 successfully decodes the segment $\overline{TU_1}$, resulting in decoded segment $TU_1$. Given the success of decoder 220, decoder bypass 230 remains inactive and decoded segment $TU_1$ (hard read data only or hard and soft read data combined) is passed by MUX 225 to combination logic 235. Buffer S 240 is currently storing decoded segment $TU_0$, so the resulting combination results in Buffer S 240 storing the combination of decoded segment $TU_0$ and decoded segment $TU_1$ (e.g., the result of an XOR of decoded segment $TU_0$ and decoded segment $TU_1$).

Memory subsystem 110 may also read encoded segment $\overline{TU_2}$ 410 from non-volatile memory 205 into volatile memory 210. Probability generator 215 generates a statistical model (e.g., LLR) based on the read and provides the encoded segment $\overline{TU_2}$ 410 and statistical model to decoder 220. Decoder 220 attempts to decode the segment $\overline{TU_2}$ 410 but indicates failure. In some embodiments, after the initial failed read of $\overline{TU_2}$ in FIG. 3, undecodable segment $\overline{TU_2}$ and its associated statistical model are stored in volatile memory 210. Undecodable segment $\overline{TU_2}$ and its associated statistical model may therefore be provided to MUX 225 from volatile memory 210 either directly or through undecodable segment ranker 250 and probability generator 215 respectively. This same process then continues for additional TU's in the stripe.

In some embodiments, as shown in FIG. 4, in response to a failure to decode, such as decoding failure 310, memory subsystem 110 provides undecodable segments $\overline{TU_2}$, $\overline{TU_3}$, and $\overline{TU_4}$ 405 as an input to recovery likelihood metric calculator 245 and undecodable segment ranker 250. Recovery likelihood metric calculator 245 calculates one or more recovery likelihood metrics for each of undecodable segments $\overline{TU_2}$, $\overline{TU_3}$, and $\overline{TU_4}$ 405. For example, as illustrated in table 400, recovery likelihood metric calculator 245 calculates a raw bit error rate for each of the undecodable segments $\overline{TU_2}$, $\overline{TU_3}$, and $\overline{TU_4}$ 405.

Recovery likelihood metric calculator 245 provides the one or more recovery likelihood metrics for each of undecodable segments $\overline{TU_2}$, $TU_3$, and $TU_4$ 405 to undecodable segment ranker 250. Undecodable segment ranker 250, ranks the undecodable segments $\overline{TU_2}$, $\overline{TU_3}$, and $\overline{TU_4}$ 405 based on the one or more recovery likelihood metrics. Undecodable segment ranker 250 provides the undecodable segment with the lowest likelihood of recovery as an input to MUX 225. For example, undecodable segment ranker 250 may determine that undecodable segment $\overline{TU_2}$ 410 has the lowest likelihood of recovery because undecodable segment $\overline{TU_2}$ 410 has the highest RBER. Undecodable segment ranker 250 therefore provides $\overline{TU_2}$ 410 as an input to MUX 225.

In response to undecodable segment $\overline{TU_2}$ 410 being passed to MUX 225 from either undecodable segment ranker 250 or volatile memory 210 (if no longer present, memory subsystem 110 can read segment $\overline{TU_2}$ 410 from non-volatile memory 205 again), MUX 225 passes encoded segment $\overline{TU_2}$ 410 to combination logic 235 and encoded segment $\overline{TU_2}$ 410 is combined with the current contents of Buffer S 240. For example, Buffer S 240 is illustrated to represent the result of decoded segment $TU_0$ XOR decoded segment $TU_1$ XOR encoded segment $\overline{TU_2}$ 410.

Figure 5:
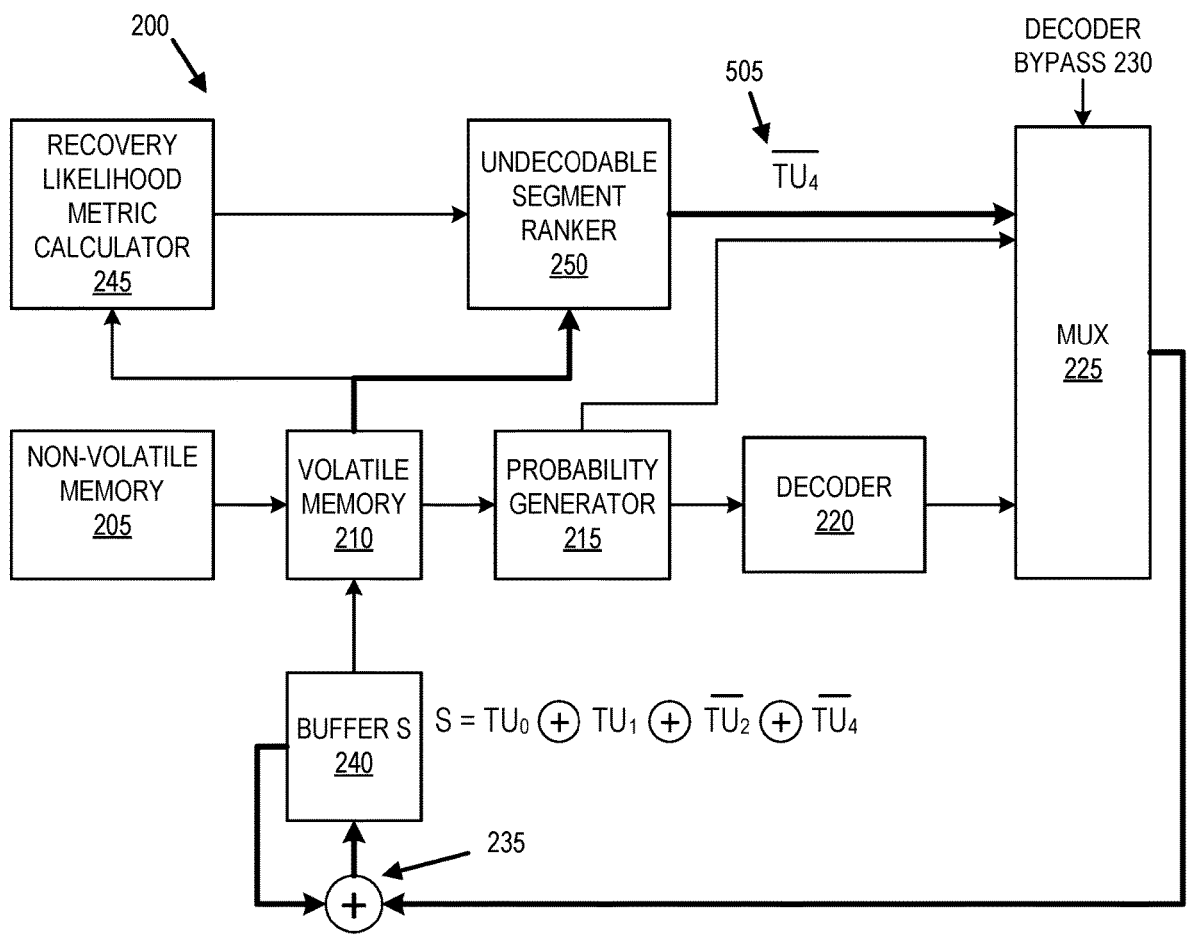
FIG. 5 is a continuation of the example of the use of logic and memory subsystem components to implement data recovery using dynamic segment ordering in accordance with some embodiments of the present disclosure.

In FIG. 5, memory subsystem 110 reads encoded segment $\overline{TU_4}$ 505 from non-volatile memory 205 into volatile memory 210. Probability generator 215 generates a statistical model (e.g., LLR) based on the read and provides the encoded segment $\overline{TU_4}$ 505 and statistical model to decoder 220. Decoder 220 attempts to decode the segment $\overline{TU_4}$ 505 but indicates failure. In some embodiments, after the initial failed read of $\overline{TU_4}$ in FIG. 4, undecodable segment $\overline{TU_4}$ and its associated statistical model are stored in volatile memory 210. Undecodable segment $\overline{TU_4}$ and its associated statistical model may therefore be provided to MUX 225 from volatile memory 210 either directly or through undecodable segment ranker 250 and probability generator 215 respectively. Memory subsystem 110 skips this process for $\overline{TU_3}$ in response to the determination in FIG. 4 that $\overline{TU_3}$ has the highest likelihood of recovery.

In some embodiments, as shown in FIG. 5, undecodable segment ranker 250 provides the undecodable segment with the next lowest likelihood of recovery as an input to MUX 225. For example, undecodable segment ranker 250 may determine that undecodable segment $\overline{TU_4}$ 505 has the next lowest likelihood of recovery because undecodable segment $\overline{TU_4}$ 505 has a higher RBER than $\overline{TU_3}$. Undecodable segment ranker 250 therefore provides $\overline{TU_4}$ 505 as an input to MUX 225.

In response to undecodable segment $\overline{TU_4}$ 505 being passed to MUX 225 from either undecodable segment ranker 250 or volatile memory 210 (if no longer present, memory subsystem 110 can read segment $\overline{TU_4}$ 505 from non-volatile memory 205 again), MUX 225 passes encoded segment $\overline{TU_4}$ 505 to combination logic 235 and encoded segment $\overline{TU_4}$ 505 is combined with the current contents of Buffer S 240. For example, Buffer S 240 can now represent the result of decoded segment $TU_0$ XOR decoded segment $TU_1$ XOR encoded segment $\overline{TU_2}$ 410 XOR encoded segment $\overline{TU_4}$ 505.

Figure 6:
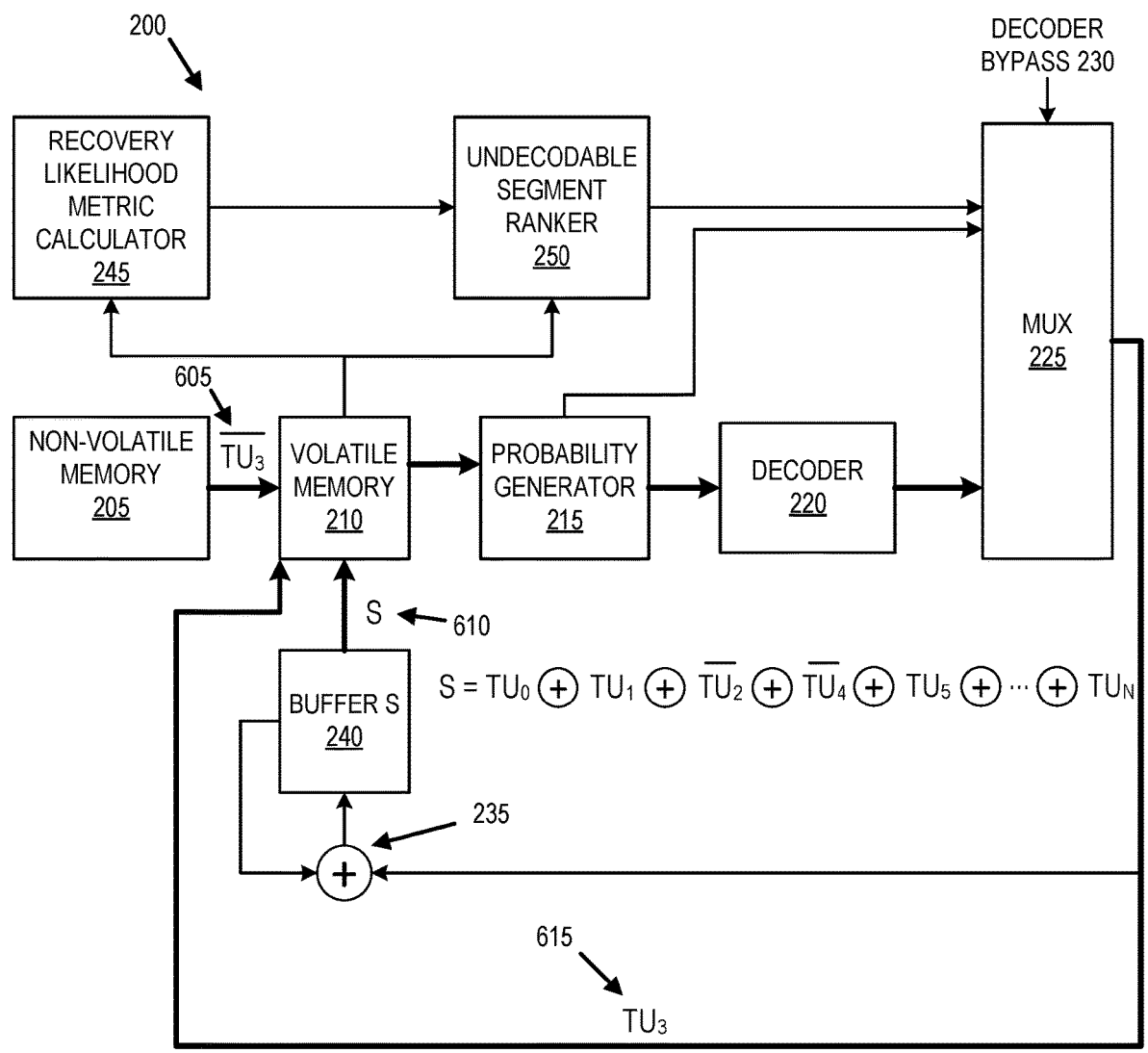
FIG. 6 is a continuation of the example of the use of logic and memory subsystem components to implement data recovery using dynamic segment ordering in accordance with some embodiments of the present disclosure.

FIG. 6 illustrates the result of continuing to read each of the other segments, $TU_5$ through $TU_N$. Each segment (encoded or decoded based upon decoder 220 failure or success) is combined with the contents of Buffer S 240. If the segment is encoded, it is provided according to the ranking determined by undecodable segment ranker 250. For the sake of illustration, each decoder failure results in an undecodable segment with a lower likelihood of recovery than undecodable segment $TU_3$ 615. In response to undecodable segment $TU_3$ 615 having the highest likelihood of recovery, memory subsystem 110 omits segment $TU_3$ 615 from the combination of read results in Buffer S 240.

Dynamic ordering data recovery component 113 retries the decoding of segment $\overline{TU_3}$ 605 using the combined segment data S 610 from Buffer S 240. For example, dynamic ordering data recovery component 113 can add S 610 to soft read data for segment $\overline{TU_3}$ 605 determined by probability generator 215. In one embodiment, probability generator 215 uses a lookup table and/or a function to combine S 610 and the LLR or other statistical model data determined by the read of segment $\overline{TU_3}$ 605. For example, probability generator 215 can select a scaling factor from a lookup table and determine the product of the scaling factor and the LLR or other statistical model data determined by the read of segment $\overline{TU_3}$ 605. As another example, probability generator 215 can use a lookup table value to otherwise increase, decrease, or otherwise update the LLR or other statistical model data determined by the read of segment $\overline{TU_3}$ 605. While FIG. 6 illustrates reading the segment $\overline{TU_3}$ 605 from non-volatile memory 205, in one embodiment, the memory subsystem 110 retains the segment $\overline{TU_3}$ 605 after decoding failure (e.g., in volatile memory 210 or in undecodable segment ranker 250) for the subsequent attempt at decoding.

Decoder 220 uses the updated statistical model data to reattempt the decoding of segment $\overline{TU_3}$ 605. When the updated statistical model data is sufficient to overcome the previous failure, decoder 220 produces decoded segment $TU_3$ 615. With decoder bypass 230 inactive, MUX 225 can pass decoded segment $TU_3$ 615 to volatile memory 210 to use in recovering the other undecodable segments.

Figure 7:
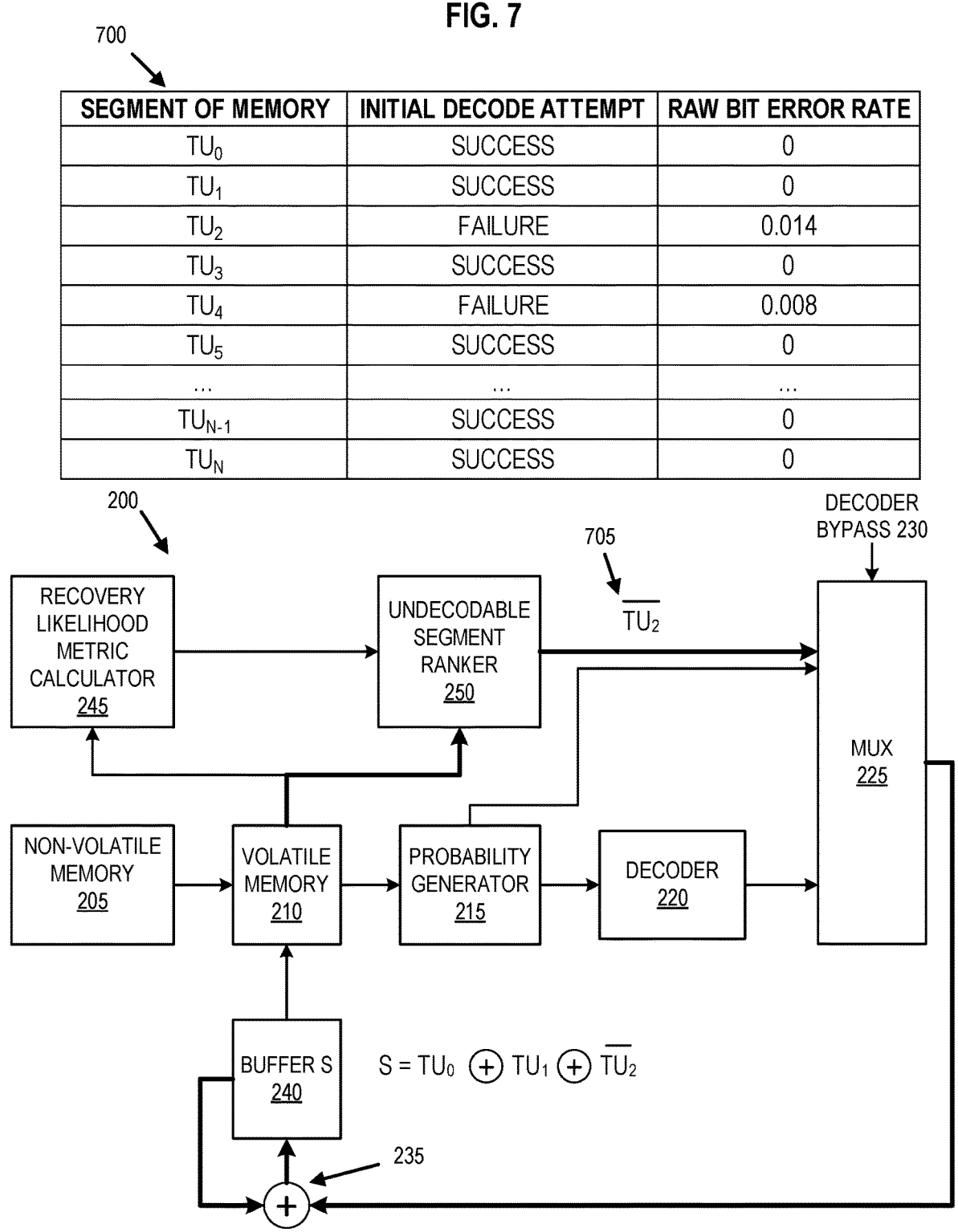
FIG. 7 is a continuation of the example of the use of logic and memory subsystem components to implement data recovery using dynamic segment ordering in accordance with some embodiments of the present disclosure.

In FIG. 7, because requested segment $\overline{TU_2}$ 305 has yet to be decoded and provided to host 120 in response to read request, dynamic ordering data recovery component 113 continues with the decoding process to decode the undecodable segment with the next highest likelihood of recovery. As illustrated in table 700, undecodable segment ranker 250 may update the ranking based on the successful decoding of $TU_3$ 615. For example, as illustrated in table 700, undecodable segment ranker 250 determines that undecodable segment $\overline{TU_4}$ now has the highest likelihood of recovery because undecodable segment $\overline{TU_4}$ now has the lowest RBER.

Memory subsystem 110 may again read an encoded segment $\overline{TU_0}$ from non-volatile memory 205 into volatile memory 210. Probability generator 215 generates a statistical model (e.g., LLR) based on the read and provides the encoded segment $\overline{TU_0}$ and statistical model to decoder 220. Decoder 220 successfully decodes the segment $\overline{TU_0}$, resulting in decoded segment $TU_0$. Given the success of decoder 220, decoder bypass 230 remains inactive and decoded segment $TU_0$ (hard read data only or hard and soft read data combined) is passed by MUX 225 to combination logic 235. Buffer S 240 is currently empty (e.g., being erased following the successful decoding of $TU_3$ 615), so the resulting combination results in Buffer S 240 storing decoded segment $TU_0$ (or decoded segment $TU_0$ combined with an initial/default value). In some embodiments, decoded segment $TU_0$ is still be stored in volatile memory 210 and is therefore provided from volatile memory 210 rather than reading from non-volatile memory 205.

Similarly, memory subsystem 110 may then again read an encoded segment $\overline{TU_1}$ from non-volatile memory 205 into volatile memory 210 and decode the segment $\overline{TU_1}$, resulting in decoded segment $TU_1$. Given the success of decoder 220, decoder bypass 230 remains inactive and decoded segment $TU_1$ is passed by MUX 225 to combination logic 235. The resulting combination results in Buffer S 240 storing the combination of decoded segment $TU_0$ and decoded segment $TU_1$ (e.g., the result of an XOR of decoded segment $TU_0$ and decoded segment $TU_1$). In some embodiments, decoded segment $TU_1$ may still be stored in volatile memory 210 and may therefore be provided from volatile memory 210 rather than reading from non-volatile memory 205.

Memory subsystem 110 also reads encoded segment $\overline{TU_2}$ 705 from non-volatile memory 205 into volatile memory 210. Probability generator 215 generates a statistical model (e.g., LLR) based on the read and provides the encoded segment $\overline{TU_2}$ 705 and statistical model to decoder 220. Decoder 220 attempts to decode the segment $\overline{TU_2}$ 705 but indicates failure. In some embodiments, encoded segment $\overline{TU_2}$ and its associated statistical model is still stored in volatile memory 210 and is therefore provided from volatile memory 210 rather than reading from non-volatile memory 205.

Undecodable segment ranker 250 provides the undecodable segment with the lowest likelihood of recovery as an input to MUX 225. In the illustrated example, undecodable segment ranker 250 provides the undecodable segment with the lowest likelihood of recovery, $\overline{TU_2}$ 705.

For example, table 700 illustrates that $\overline{TU_2}$ 705 has the lowest likelihood of recovery because undecodable segment $\overline{TU_2}$ 705 has the highest RBER. Undecodable segment ranker 250 therefore provides $\overline{TU_2}$ 705 as an input to MUX 225. In some embodiments, all the undecodable segments are again presented as inputs to recovery likelihood metric calculator 245 and undecodable segment ranker 250. In such embodiments, recovery likelihood metric calculator 245 determines the one or more recovery likelihood metrics for each of the undecodable segments and provide them to undecodable segment ranker 250 for reranking.

In response to undecodable segment $\overline{TU_2}$ 705 being passed to MUX 225 from either undecodable segment ranker 250 or volatile memory 210 (if no longer present, memory subsystem 110 can read segment $\overline{TU_2}$ 705 from non-volatile memory 205 again). MUX 225 passes encoded segment $\overline{TU_2}$ 705 to combination logic 235 and encoded segment $\overline{TU_2}$ 705 is combined with the current contents of Buffer S 240. For example, Buffer S 240 can now represent the result of decoded segment $TU_0$ XOR decoded segment $TU_1$ XOR encoded segment $\overline{TU_2}$ 705.

Figure 8:
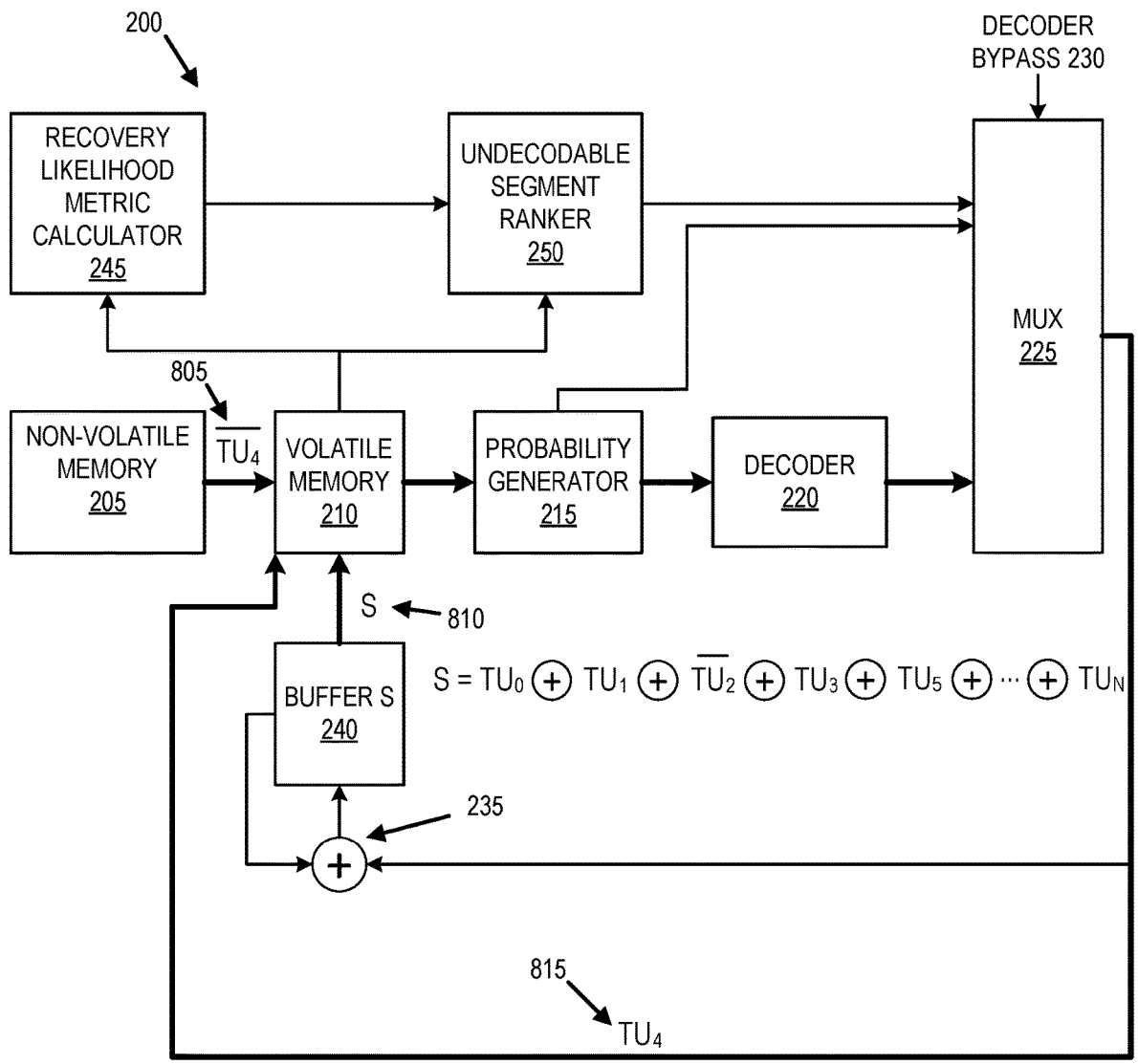
FIG. 8 is a continuation of the example of the use of logic and memory subsystem components to implement data recovery using dynamic segment ordering in accordance with some embodiments of the present disclosure.

FIG. 8 illustrates the result of continuing to read each of the other segments, $TU_5$ through $TU_N$. Each segment (encoded or decoded based upon decoder 220 failure or success) is combined with the contents of Buffer S 240. If segment is decoded, it is provided according to the ranking determined by undecodable segment ranker 250. Given that undecodable segment $TU_4$ 615 has the highest likelihood of recovery, memory subsystem 110 omits segment $TU_4$ 615 from the combination of read results in Buffer S 240. Given that segment $TU_3$ was successfully decoded in a previous iteration, decoded segment $TU_3$ is also combined in Buffer S 240.

Dynamic ordering data recovery component 113 retries the decoding of segment $\overline{TU_4}$ 805 using the combined segment data S 810 from Buffer S 240. For example, dynamic ordering data recovery component 113 can add S 810 to soft read data for segment $\overline{TU_4}$ 805 determined by probability generator 215. In one embodiment, probability generator 215 uses a lookup table and/or a function to combine S 810 and the LLR or other statistical model data determined by the read of segment $\overline{TU_4}$ 805. For example, probability generator 215 can select a scaling factor from a lookup table and determine the product of the scaling factor and the LLR or other statistical model data determined by the read of segment $\overline{TU_4}$ 805. As another example, probability generator 215 can use a lookup table value to otherwise increase, decrease, or otherwise update the LLR or other statistical model data determined by the read of segment $\overline{TU_4}$ 805. While FIG. 8 illustrates reading the segment $\overline{TU_4}$ 805 from non-volatile memory 205, in one embodiment, the memory subsystem 110 retains the segment $\overline{TU_4}$ 805 after decoding failure (e.g., in volatile memory 210 or in undecodable segment ranker 250) for the subsequent attempt at decoding.

Decoder 220 uses the updated statistical model data to reattempt the decoding of segment $\overline{TU_4}$ 805. When the updated statistical model data is sufficient to overcome the previous failure, decoder 220 produces decoded segment $TU_4$ 815. With decoder bypass 230 inactive, MUX 225 can pass decoded segment $TU_4$ 815 to volatile memory 210 to use in recovering the other undecodable segment.

In some embodiments, when an undecodable segment fails to decode, Memory subsystem 110 aborts data recovery using dynamic segment ordering and provides an error message to host 120. For example, if decoder 220 fails to decode $\overline{TU_4}$ 805, memory subsystem 110 stops the data recovery using dynamic segment ordering process. Since $\overline{TU_4}$ 805 is the undecodable segment with the highest likelihood of recovery, memory subsystem 110 does not try to decode $\overline{TU_2}$.

Figure 9:
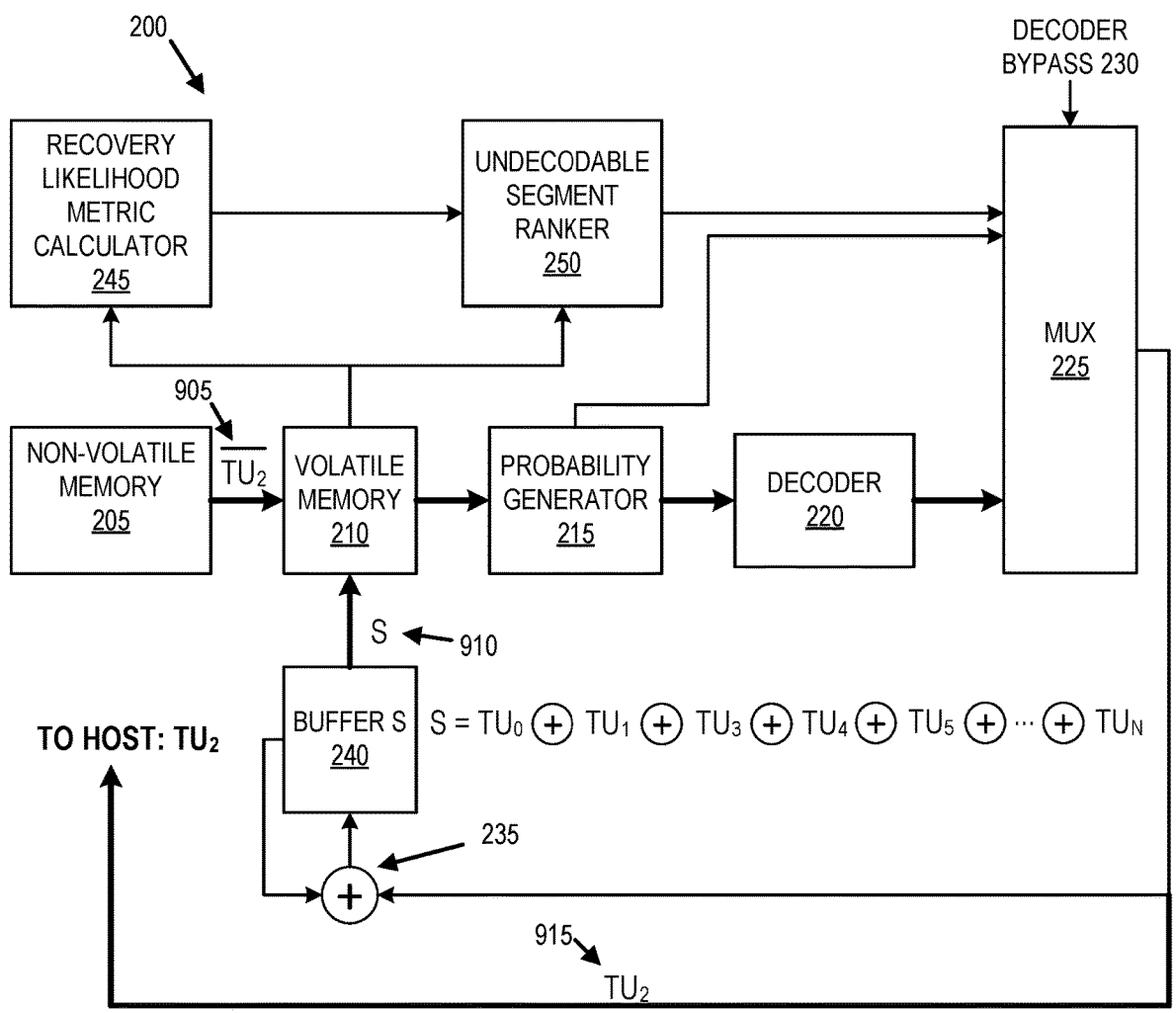
FIG. 9 is a continuation of the example of the use of logic and memory subsystem components to implement data recovery using dynamic segment ordering in accordance with some embodiments of the present disclosure.

In FIG. 9, because requested segment $\overline{TU_2}$ 305 has yet to be decoded and provided to host 120 in response to read request, dynamic ordering data recovery component 113 continues with the decoding process to decode the undecodable segment with the next highest likelihood of recovery. Undecodable segment ranker 250 may update the ranking based on the successful decoding of $TU_4$ 815. In the illustrated example, undecodable segment ranker 250 determines that undecodable segment $\overline{TU_2}$ 905 now has the highest likelihood of recovery because undecodable segment $\overline{TU_2}$ 905 n now has the lowest RBER. In some embodiments, undecodable segment $\overline{TU_2}$ 905 may be chosen because it is the only undecodable segment remaining.

Memory subsystem 110 may repeat the earlier steps of reading encoded segments from non-volatile memory 205 into volatile memory 210, generating a statistical model, and decoding the encoded segments. In some embodiments, memory system 110 utilizes the encoded segments, statistical models, and decoded segments store in volatile memory 210.

Memory subsystem 110 may repeat this process for all segments, $TU_1$ through $TU_N$ excluding segment $TU_2$ (i.e., the segment to be decoded). Each segment (encoded or decoded based upon decoder 220 failure or success) is combined with the contents of Buffer S 240. If segment is decoded, it is provided according to the ranking determined by undecodable segment ranker 250. Given that undecodable segment $TU_2$ 915 has the highest likelihood of recovery or is the only undecodable segment remaining, segment $TU_2$ 915 is omitted from the combination of read results in Buffer S 240. Given that segments $TU_3$ and $TU_4$ have been successfully decoded, decoded segments $TU_3$ and $TU_4$ are also combined in Buffer S 240.

Dynamic ordering data recovery component 113 then retries the decoding of segment $\overline{TU_2}$ 905 using the combined segment data S 910 from Buffer S 240. For example, dynamic ordering data recovery component 113 can add S 910 to soft read data for segment $\overline{TU_2}$ 905 determined by probability generator 215. In one embodiment, probability generator 215 uses a lookup table and/or a function to combine S 910 and the LLR or other statistical model data determined by the read of segment $\overline{TU_2}$ 905. For example, probability generator 215 can select a scaling factor from a lookup table and determine the product of the scaling factor and the LLR or other statistical model data determined by the read of segment $\overline{TU_2}$ 905. As another example, probability generator 215 can use a lookup table value to otherwise increase, decrease, or otherwise update the LLR or other statistical model data determined by the read of segment $\overline{TU_2}$ 905. While FIG. 9 illustrates reading the segment $\overline{TU_2}$ 905 from non-volatile memory 205, in one embodiment, the memory subsystem 110 retains the segment $\overline{TU_2}$ 905 after decoding failure (e.g., in volatile memory 210 or in undecodable segment ranker 250) for the subsequent attempt at decoding.

Decoder 220 uses the updated statistical model data to reattempt the decoding of segment $\overline{TU_2}$ 905. When the updated statistical model data is sufficient to overcome the previous failure, decoder 220 produces decoded segment $TU_2$ 915. With decoder bypass 230 inactive, MUX 225 can pass decoded segment $TU_2$ 915 to host 120 in response to the read request. For example, dynamic ordering data recovery component 113 can store decoded segment $TU_2$ 915 in volatile memory 210 at a particular address or location and provide that address or location to host 120 to retrieve the requested data.

Figure 10B:
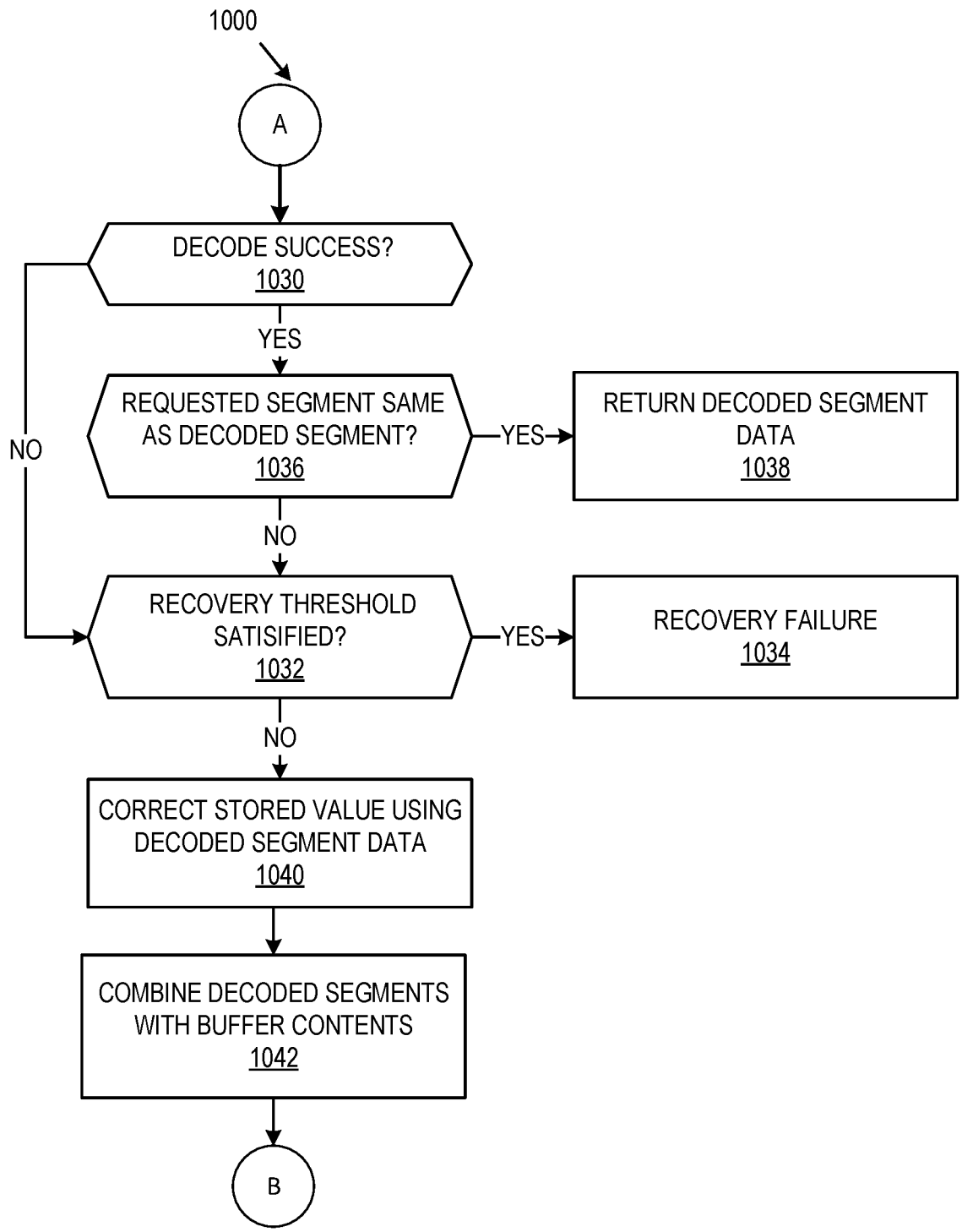
FIG. 10B is a continuation of the flow diagram of the example method for data recovery using dynamic segment ordering in accordance with some embodiments of the present disclosure.

FIG. 10 (illustrated as FIGS. 10A-10B) is a flow diagram of an example method 1000 to recover data using a data recovery using dynamic segment ordering scheme, in accordance with some embodiments of the present disclosure. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the dynamic ordering data recovery component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1002, the processing device initiates a read of a requested segment. For example, a host system can request a segment data to be read by the memory subsystem. The processing device reads the raw encoded data from non-volatile memory and generates a statistical model as described above. The processing device can use the statistical model in attempt to decode the segment, e.g., according to LDPC or another ECC algorithm.

At operation 1004, the processing device determines if the decoding of the requested segment succeeded or failed. The decoding of the segment fails when the decoder is unable to satisfy the parity checks according to the ECC algorithm.

If the decoding succeeded, at operation 1006, the processing device returns the decoded data. For example, the processing device can alert the host system as to a volatile memory location storing the decoded data in response to the read request.

If the decoding failed, at operation 1008, the processing device initiates the reading of another segment in the stripe of the requested segment. For example, in order to recover the requested data, the processing device will read each of the other segments of the stripe containing the requested segment. Each segment will, in turn, be treated by the processing device as the "current segment."

At operation 1010, the processing device determines if the decoding of the current segment succeeded or failed. If the decoding succeeded, at operation 1012, the processing device combines the decoded segment with the current contents (if any) of a segment buffer. As described above, the combination process can be a simple XOR operation or a more complex combination of using a lookup table and/or formula to generate an updated combined value.

At operation 1014, the processing device determines if another segment in the stripe remains to be processed. If there is another segment, that segment becomes the current segment and the method 1000 returns to operation 1008 to initiate a read of the current segment. If there are not remaining segments in the stripe, the method 1000 proceeds to operation 1020.

If the decoding failed, at operation 1016, the processing device determines likelihood metrics for the current undecodable segment. For example, as explained above, the processing device may calculate a combination of one or more of RBER, ARC RBER, Vt distribution shape, and Vt shift.

At operation 1018, the processing device stores the likelihood metrics for the current undecodable segment. For example, the processing device may store the likelihood metrics in volatile or nonvolatile memory where they can be retrieved for future operations. The method 1000 proceeds to operation 1014 as described above.

At operation 1020, the processing device ranks the undecodable segments based on the likelihood metrics. For example, based on the likelihood metrics for each of the undecodable segments, the processing device determines an order of segments from most likely to be recovered to least likely to be recovered.

At operation 1022, the processing device combines the raw encoded segments with the lowest likelihood of recovery with the current contents (if any) of a segment buffer (e.g., omitting the segment having the highest likelihood of recovery). Again, the combination process can be a simple XOR operation or a more complex combination of using a lookup table and/or formula to generate an updated combined value.

At operation 1024, upon combining the read results of the other segments in the stripe and as described above, the processing device accumulates a hard read value and one or more soft read values for the undecodable segment with the highest likelihood of recovery as well as the buffer contents that represent the combination of reads of the other segments in the stripe. For example, the read of the encoded segment with the highest likelihood of recovery can result in a hard read value and two soft read values. The combined value resulting from the reads of the other segments in the stripe can be treated as another soft read value or another component of the statistical model for the requested segment.

At operation 1026, the processing device updates the soft read value(s) using the buffer contents. As described above, the processing device can select a scaling factor from a lookup table and determine the product of the scaling factor and the statistical model data determined by the read of undecodable segment with the highest likelihood of recovery to generate an updated statistical model.

At operation 1028, the processing device reattempts the decoding of the segment with the highest likelihood of recovery using the updated statistical model (e.g., updated soft read values). This renewed attempt at decoding the requested data can generate different results due to the use of different input(s) for the soft decoding process. Method 1000 then proceeds via off-page connector A to operation 1030.

At operation 1030, the processing device determines if the decoding succeeded. If the decoding succeeded, at operation 1036, the processing device determines whether the requested segment is the same as the decoded segment. For example, the processing device can determine whether the segment associated with the read request from operation 1002 is the same as the segment that was successfully decoded at operation 1030. If the requested segment is not the same as the decoded segment, at operation 1032, the processing device determines if a recovery threshold has been satisfied. If the requested segment is the same as the decoded segment, at operation 1038, the processing device returns the decoded segment data. For example, the processing device can alert the host system as to a volatile memory location storing the decoded data in response to the read request.

If the decoding failed, at operation 1032, the processing device determines if a recovery threshold has been satisfied. For example, a recovery threshold can be satisfied when a number of attempts to recover segments in the current stripe reaches or exceeds a threshold value or an amount of time attempting the recovery of one or more segments reaches or exceeds a threshold amount of time. If the recovery threshold has not been satisfied, method 1000 proceeds to operation 1040 to correct the stored value of the decoded segment. If the recovery threshold has been satisfied, at operation 1034, the processing device generates an indication of recovery failure.

At operation 1040, the processing device corrects the stored value of the decoded segment. For example, the processing device may replace the raw encoded data with decoded data for the decoded segment. The processing device may also update the recovery likelihood metrics and the associated ranks to indicate that the decoded segment has been decoded.

At operation 1042, the processing device combines the decoded segment with buffer contents. For example, the processing device may combine all the previous decoded segments as well as the newly decoded segment to replace the current contents (if any) of a segment buffer. As described above, the combination process can be a simple XOR operation or a more complex combination of using a lookup table and/or formula to generate an updated combined value. Method 1000 then proceeds via off-page connector B to operation 1022. Operations 1022-1030 are then repeated using the newly selected segment (e.g., with the next highest likelihood of recovery) as the focus of the recovery process.

Figure 11:
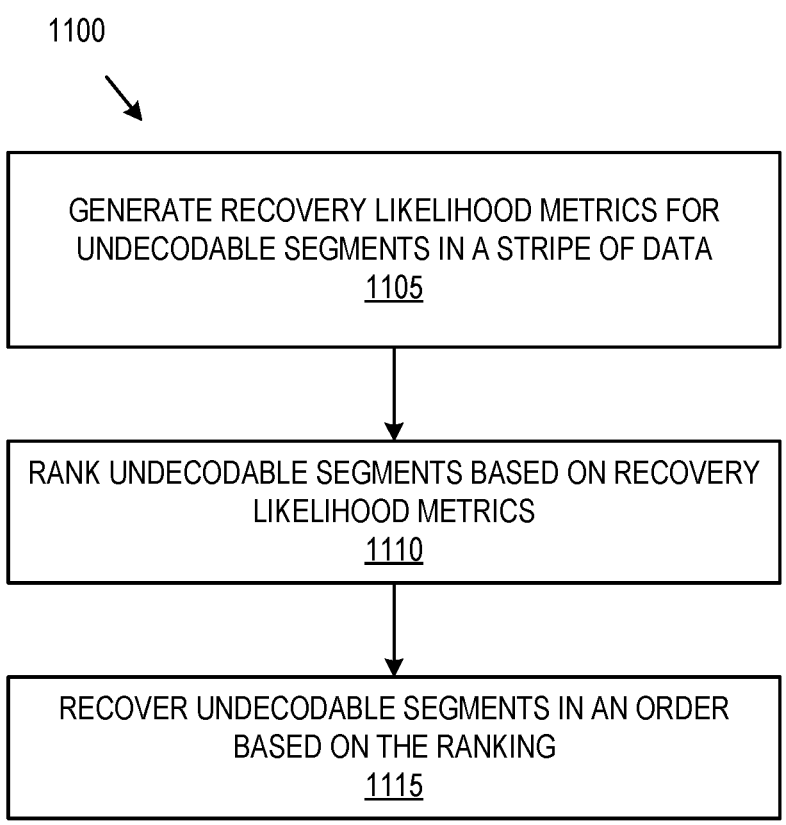
FIG. 11 is a flow diagram of another example method for data recovery using dynamic segment ordering in accordance with some embodiments of the present disclosure.

FIG. 11 is a flow diagram of another example method 1100 for data recovery using dynamic segment ordering, in accordance with some embodiments of the present disclosure. The method 1100 can be performed by processing logic that can includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the dynamic ordering data recovery component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1105, the processing device generates recovery likelihood metrics for undecodable segments in a stripe of data. For example, as explained in detail above, the processing device may calculate a combination of one or more of RBER, ARC RBER, Vt distribution shape, and Vt shift.

At operation 1110, the processing device ranks the undecodable segments based on the recovery likelihood metrics. For example, the processing device may rank the undecodable segments with the highest recovery likelihood metrics (e.g., lowest RBER) the highest and may further rank the undecodable segments with the lowest recovery likelihood metrics (e.g., highest RBER) the lowest.

At operation 1115, the processing device recovers the undecodable segments in an order based on the ranking. For example, the processing device may first attempt to recover the undecodable segment with the highest likelihood of recovery based on the recovery likelihood metrics. It is noted that the term recovers encompasses both successful and unsuccessful attempts at recovering the undecodable segments. In some embodiments, the processing device successfully recovers some but not all undecodable segments. In other embodiments, the processing device does not recover any undecodable segments. In still other embodiments, the processing device recovers all undecodable segments. All these possibilities are encompassed by the terms recovers.

Figure 12:
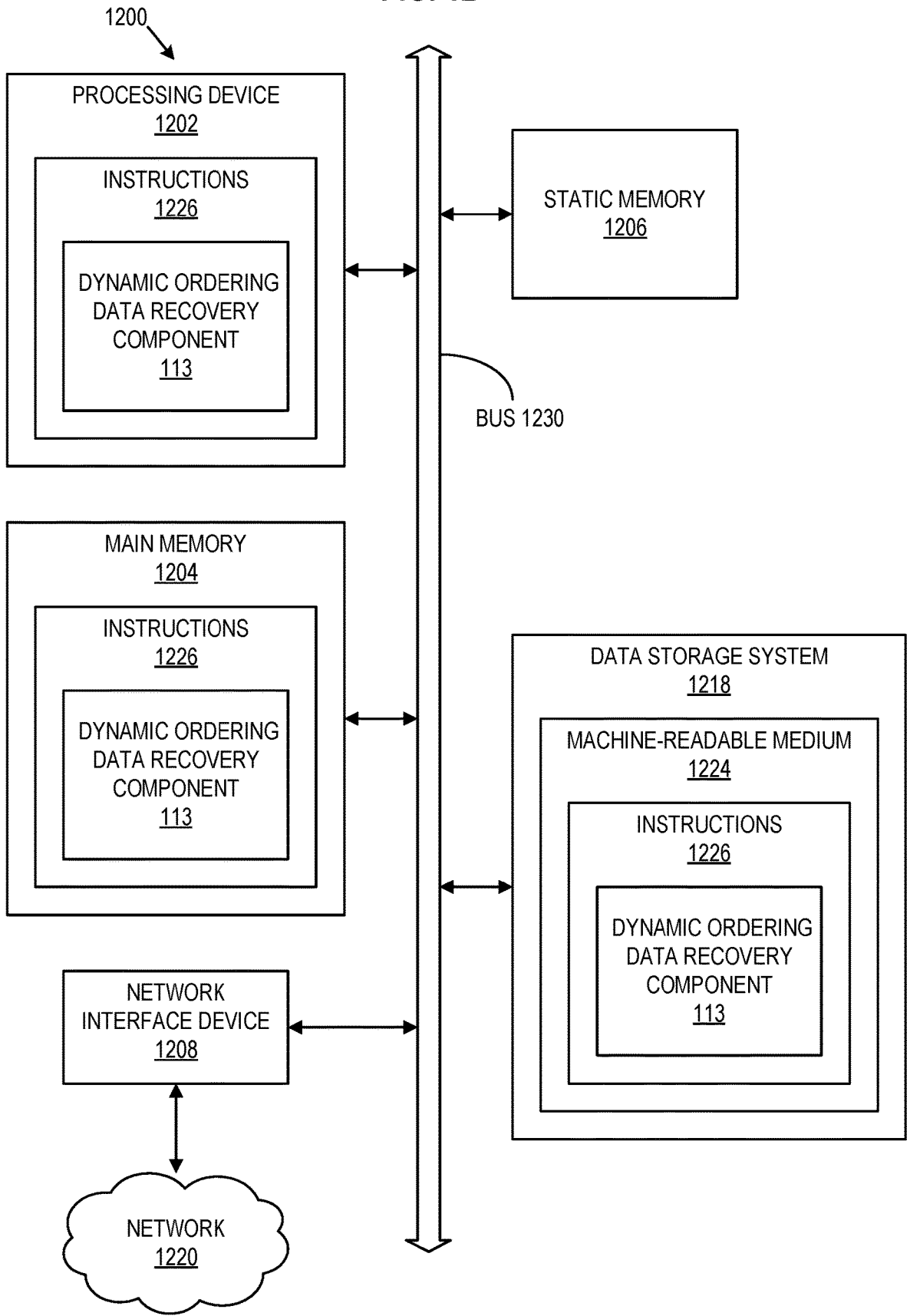
FIG. 12 is a block diagram of an example computer system in which embodiments of the present disclosure may operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the dynamic ordering data recovery component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory subsystem 110 of FIG. 1.

In one embodiment, the instructions 1226 include instructions to implement functionality corresponding to a dynamic ordering data recovery component (e.g., the dynamic ordering data recovery component 113 of FIG. 1). While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 1000 and 1100 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   generating, for each of a plurality of undecodable segments in a stripe of data distributed across a redundant array of storage nodes, one or more recovery likelihood metrics, wherein each of the one or more recovery likelihood metrics are based on a determination of a likelihood of recovering the undecodable segment;
   ranking, based on the one or more recovery likelihood metrics, the plurality of undecodable segments; and
   recovering the plurality of undecodable segments in an order based on the ranking starting with an undecodable segment associated with a highest likelihood of recovery.

2. The method of claim 1, wherein the one or more recovery likelihood metrics comprises a raw bit error rate of an associated undecodable segment, wherein the determination of the likelihood of recovering the undecodable segment comprises determining the raw bit error rate of the associated undecodable segment, and wherein the undecodable segment associated with the highest likelihood of recovery comprises an undecodable segment with a lowest raw bit error rate of the plurality of undecodable segments.

3. The method of claim 1, wherein the one or more recovery likelihood metrics comprises a threshold voltage shift of an associated undecodable segment, wherein the determination of the likelihood of recovering the undecodable segment comprises determining the threshold voltage shift of the associated undecodable segment, and wherein the undecodable segment associated with the highest likelihood of recovery comprises an undecodable segment with a lowest threshold voltage shift of the plurality of undecodable segments.

4. The method of claim 1, wherein the one or more recovery likelihood metrics comprises a change in threshold voltage distribution of an associated undecodable segment, wherein the determination of the likelihood of recovering the undecodable segment comprises determining the change in threshold voltage distribution of the associated undecodable segment, and wherein the undecodable segment associated with the highest likelihood of recovery comprises an undecodable segment with a smallest change in threshold voltage distribution of the plurality of undecodable segments.

5. The method of claim 1, further comprising:
   generating a statistical model based on raw encoded data for the plurality of undecodable segments and further based on decoded data for one or more decodable segments in the stripe of data and wherein the recovering the plurality of undecodable segments includes using the statistical model.

6. The method of claim 5, wherein the statistical model includes a likelihood of the raw encoded data being correct based on an error correction scheme used to decode the raw encoded data.

7. The method of claim 1, wherein the generating the one or more recovery likelihood metrics is in response to a failure to decode a segment of data in the stripe of data.

8. A non-transitory computer-readable storage medium comprising instructions that, when executed by a processing device, cause the processing device to:
   generate, for each of a plurality of undecodable segments in a stripe of data distributed across a redundant array of storage nodes, one or more recovery likelihood metrics, wherein each of the one or more recovery likelihood metrics are based on a determination of a likelihood of recovering the undecodable segment;

rank, based on the one or more recovery likelihood metrics, the plurality of undecodable segments; and recover the plurality of undecodable segments in an order based on the ranking starting with an undecodable segment associated with a highest likelihood of recovery.

9. The non-transitory computer-readable storage medium of claim 8, wherein the one or more recovery likelihood metrics comprises a raw bit error rate of an associated undecodable segment, wherein the determination of the likelihood of recovering the undecodable segment comprises determining the raw bit error rate of the associated undecodable segment, and wherein the undecodable segment associated with the highest likelihood of recovery comprises an undecodable segment with a lowest raw bit error rate of the plurality of undecodable segments.

10. The non-transitory computer-readable storage medium of claim 8, wherein the one or more recovery likelihood metrics comprises a threshold voltage shift of an associated undecodable segment, wherein the determination of the likelihood of recovering the undecodable segment comprises determining the threshold voltage shift of the associated undecodable segment, and wherein the undecodable segment associated with the highest likelihood of recovery comprises an undecodable segment with a lowest threshold voltage shift of the plurality of undecodable segments.

11. The non-transitory computer-readable storage medium of claim 8, wherein the one or more recovery likelihood metrics comprises a change in threshold voltage distribution of an associated undecodable segment, wherein the determination of the likelihood of recovering the undecodable segment comprises determining the change in threshold voltage distribution of the associated undecodable segment, and wherein the undecodable segment associated with the highest likelihood of recovery comprises an undecodable segment with a smallest change in threshold voltage distribution of the plurality of undecodable segments.

12. The non-transitory computer-readable storage medium of claim 8, wherein the processing device is further to:

generate a statistical model based on raw encoded data for the plurality of undecodable segments and further based on decoded data for one or more decodable segments in the stripe of data and wherein the recovering the plurality of undecodable segments includes using the statistical model.

13. The non-transitory computer-readable storage medium of claim 12, wherein the statistical model includes a likelihood of the raw encoded data being correct based on an error correction scheme used to decode the raw encoded data.

14. The non-transitory computer-readable storage medium of claim 12, wherein the generating the one or more recovery likelihood metrics is in response to a failure to decode a segment of data in the stripe of data.

15. A system comprising:
a plurality of memory devices; and
a processing device, operatively coupled with the plurality of memory devices, to:
generate, for each of a plurality of undecodable segments in a stripe of data distributed across a redundant array of storage nodes, one or more recovery likelihood metrics, wherein each of the one or more recovery likelihood metrics are based on a determination of a likelihood of recovering the undecodable segment;
rank, based on the one or more recovery likelihood metrics, the plurality of undecodable segments; and
recover the plurality of undecodable segments in an order based on the ranking starting with an undecodable segment associated with a highest likelihood of recovery;
wherein the one or more recovery likelihood metrics comprises a raw bit error rate of an associated undecodable segment, wherein the determination of the likelihood of recovering the undecodable segment comprises determining the raw bit error rate of the associated undecodable segment, and wherein the undecodable segment associated with the highest likelihood of recovery comprises an undecodable segment with a lowest raw bit error rate of the plurality of undecodable segments.

16. The system of claim 15, wherein the one or more recovery likelihood metrics further comprises a threshold voltage shift of an associated undecodable segment, wherein the determination of the likelihood of recovering the undecodable segment comprises determining the threshold voltage shift of the associated undecodable segment, and wherein the undecodable segment associated with the highest likelihood of recovery comprises an undecodable segment with a lowest threshold voltage shift of the plurality of undecodable segments.

17. The system of claim 15, wherein the one or more recovery likelihood metrics further comprises a change in threshold voltage distribution of an associated undecodable segment, wherein the determination of the likelihood of recovering the undecodable segment comprises determining the change in threshold voltage distribution of the associated undecodable segment, and wherein the undecodable segment associated with the highest likelihood of recovery comprises an undecodable segment with a smallest change in threshold voltage distribution of the plurality of undecodable segments.

18. The system of claim 15, wherein the processing device is further to:
generate a statistical model based on raw encoded data for the plurality of undecodable segments and further based on decoded data for one or more decodable segments in the stripe of data and wherein the recovering the plurality of undecodable segments includes using the statistical model.

19. The system of claim 18, wherein the statistical model includes a likelihood of the raw encoded data being correct based on an error correction scheme used to decode the raw encoded data.

20. The system of claim 15, wherein the generating the one or more recovery likelihood metrics is in response to a failure to decode a segment of data in the stripe of data.

* * * * *